(No Model.) 3 Sheets—Sheet 1.
G. W. FOYE.
VEHICLE MOTOR.
No. 575,639. Patented Jan. 19, 1897.
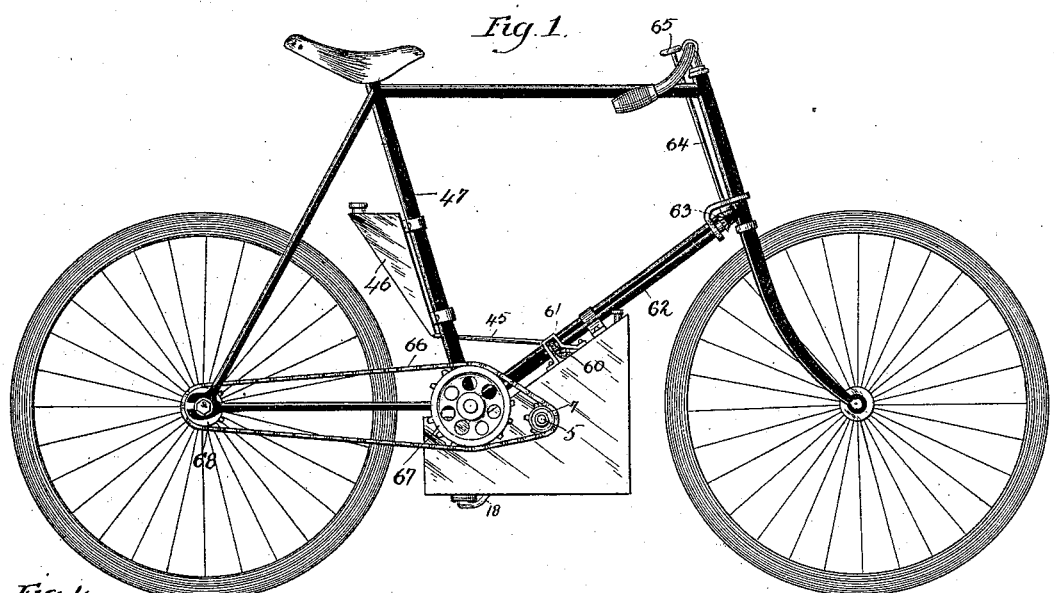
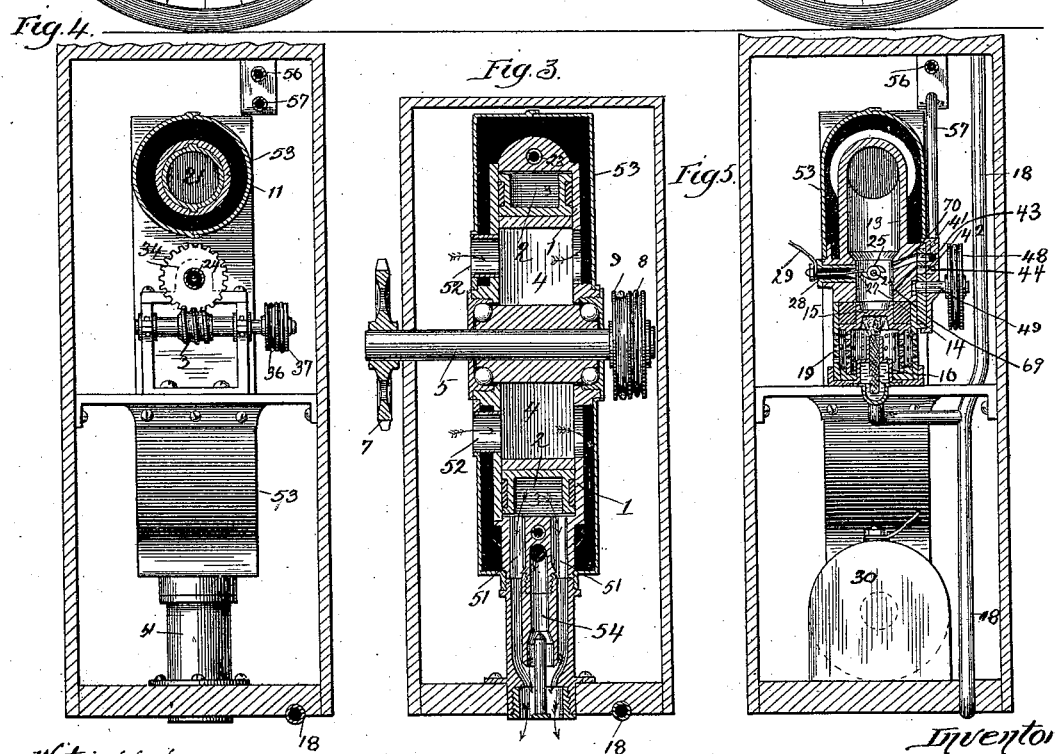
Witnesses:
H. B. Hallock
S. S. Williamson
Inventor:
George W. Foye
by Geo. H. Holgate
Attorney

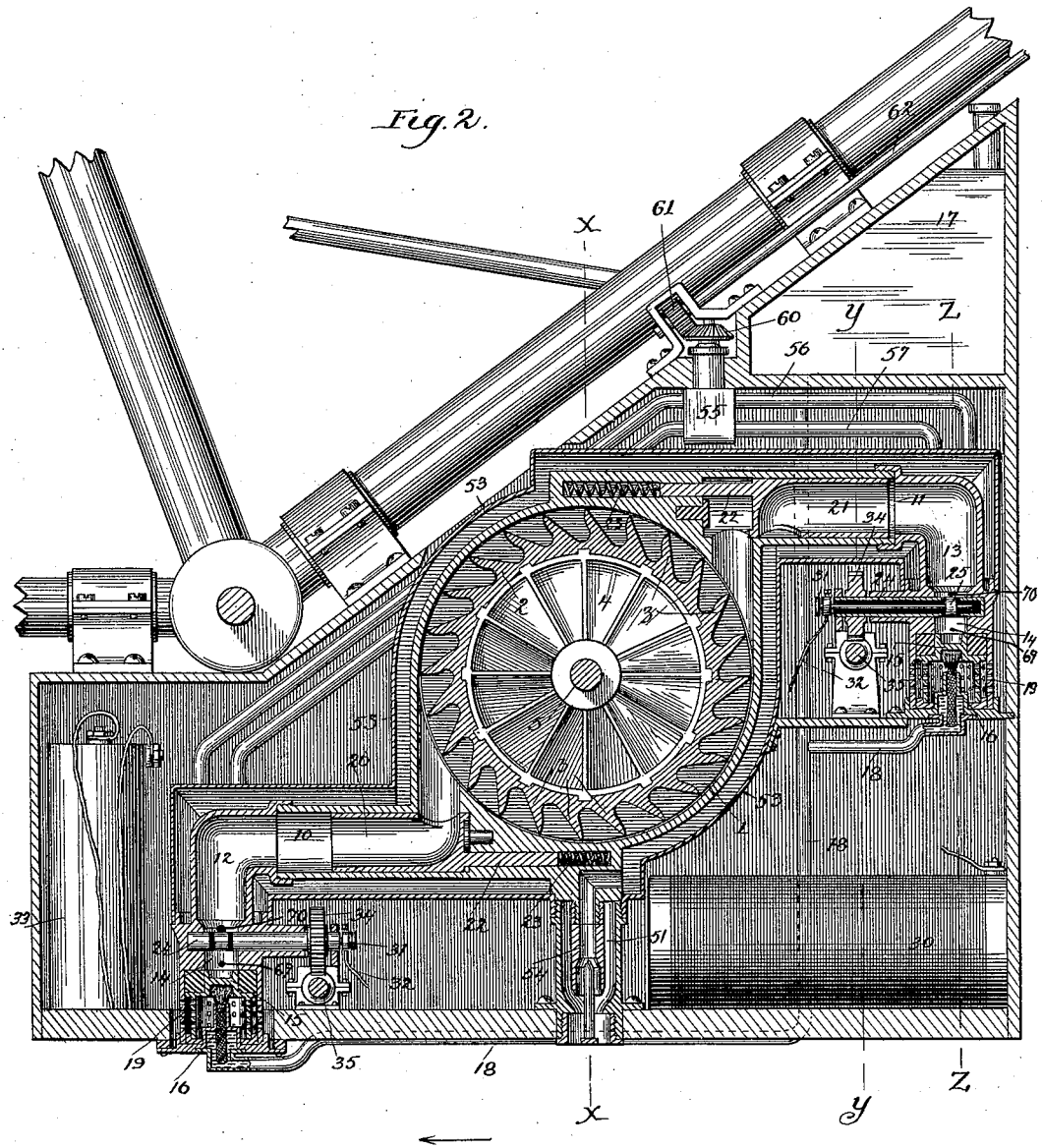

(No Model.) 3 Sheets—Sheet 3.

G. W. FOYE.
VEHICLE MOTOR.

No. 575,639. Patented Jan. 19, 1897.

Witnesses:
H. B. Hallock
S. J. Williamson

Inventor
George W. Foye
by Geo. H. Holgate
Attorney

UNITED STATES PATENT OFFICE.

GEORGE W. FOYE, OF PHILADELPHIA, PENNSYLVANIA.

VEHICLE-MOTOR.

SPECIFICATION forming part of Letters Patent No. 575,639, dated January 19, 1897.

Application filed April 28, 1896. Serial No. 589,421. (No model.)

*To all whom it may concern:*

Be it known that I, GEORGE W. FOYE, a citizen of the United States, residing at Philadelphia, in the county of Philadelphia and State of Pennsylvania, have invented certain new and useful Improvements in Vehicle-Motors, of which the following is a specification.

My invention relates to a new and useful improvement in gas-motors for various kinds of vehicles, and especially bicycles and the like, and has for its object to provide a motor of this description which will occupy small space and by means of which a vehicle may be propelled either entirely or in conjunction with the usual foot-power mechanism; and with these ends in view my invention consists in the details of construction and combination of elements hereinafter set forth and then specifically designated by the claims.

In order that those skilled in the art to which this invention appertains may understand how to make and use the same, I will describe its construction and operation in detail, referring by number to the accompanying drawings, forming a part of this specification, in which—

Figure 6:
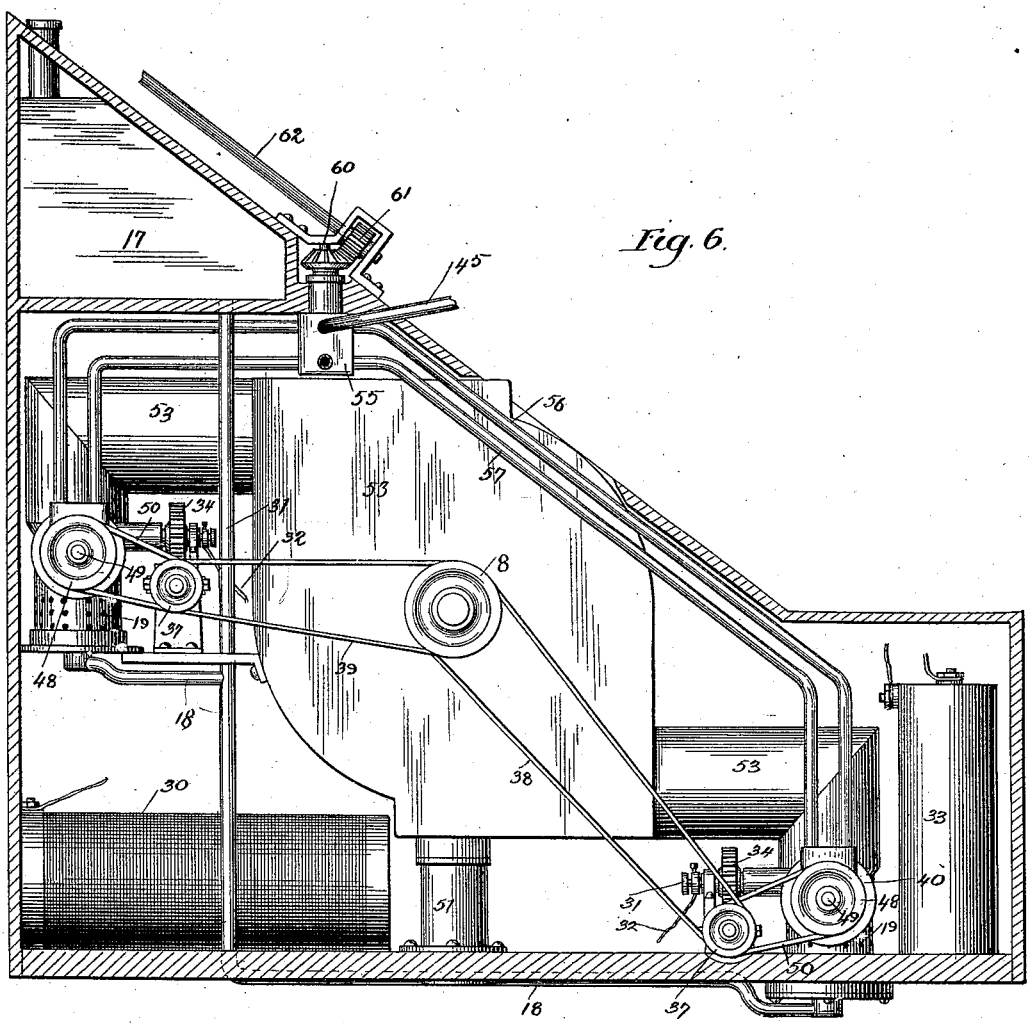
Figure 7:
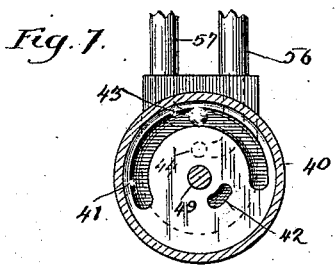

Figure 1 is a side elevation of a bicycle having my improvement applied thereto; Fig. 2, a longitudinal vertical section of the motor, showing the several mechanisms thereof; Fig. 3, a section at the line *x x* of Fig. 2; Fig. 4, a similar view at the line *y y;* Fig. 5, a similar view at the line *z z,* all looking in the direction of the arrow; Fig. 6, an enlarged outside view of the casing and pulleys for transmitting motion from the motor-shaft to the several valves, looking in the opposite direction from Fig. 2; Fig. 7, a detailed section of the bearing of one of the automatic feed-valves, showing the valve in elevation.

Referring to the drawings, 1 represents a casing, which is so shaped as to contain the motor-wheel 2, which is composed of a number of blades 3, formed upon a rim, and this rim is supported by an exhaust-fan 4, having suitable blades for causing the circulation of air, as hereinafter set forth. The fan 4 is secured upon the power-shaft 5, and the motor-wheel is secured to the periphery of the fan, so as to turn therewith. The power-shaft 5 is journaled in the casing and projects through both sides thereof and has secured upon one end the sprocket-wheel 7 and upon the other end two band-wheels 8 and 9. Formed with the casing are tubular extensions 10 and 11, to which are connected the right-angled tubes 12 and 13, respectively, and each of these tubes leads to or has formed therewith a retort or converting-chamber 14, it being understood that both of these chambers and the mechanism next described in connection therewith are exact duplicates and will therefore be referred to by the same designating-numbers.

The bottoms of each of the chambers 14 consist of diaphragms 15 of suitable metal, to be heated by a lamp 16, placed therebeneath, in order that when oil is projected from passage 69 within the chamber 14 and comes in contact with the diaphragm 15 it will be converted into gas. The form of lamp for heating these diaphragms may be of any desired construction, but I have here shown a lamp adapted to use alcohol as a fuel, and this is fed thereto from the tank 17 through the pipe 18, which is branched, so as to supply both of the lamps. The compartments in which the lamps are placed are surrounded by perforated walls 19, by means of which the proper amount of air for combustion is fed to the flames, and, as before described, these flames heat the diaphragms 15, by means of which the oil is converted into gas.

Arranged within the extensions 10 and 11 are plunger-valves 20 and 21, respectively, having openings formed therethrough which correspond to the tubes 12 and 13, and these openings also turn upward and downward and match the openings in the casing which lead to the extensions. 22 are rods, which extend from the plunger-valves into holes formed in the casing and are normally held outward by the springs 23, so as to hold the valves in their closed position, yet permit them to be opened when sufficient force is brought to bear upon their sides next the retorts. The object of this arrangement of valves is to permit the gas formed in the retorts to open them automatically, thereby gaining access to the portion of the casing in which the motor-wheel is located.

In order that the gas after having been formed may be exploded for the purpose of increasing its volume, spindles 24 are journaled within the retorts 14 and are insulated therefrom by suitable bearings, and each of these spindles has secured thereon a sparker 25, having contact-points projecting therefrom adapted to engage the spring-electrode 27, which is also insulated from the casing by a suitable bushing 28, and from this electrode leads a wire 29, which passes to the induction-coil 30.

31 are commutators mounted upon the outer ends of the spindles 24, and these commutators are connected to the opposite side of the induction-coil by the wires 32, so that when an electric current is passed through the primary wire of said induction-coil and the spindles are revolved a spark will be emitted by the points of the sparkers making and breaking the circuit in connection with the electrodes, as is well understood in gas-engines.

The primary coil of the induction-coil is included in the circuit, in which the battery 33 is also included. Motion is imparted to the spindles 24 by worm-wheels 34, secured thereon and meshing with the worms 35, which are journaled at right angles thereto and have secured upon their shanks pulleys 36 and 37, which receive their motion from the pulleys 8 and 9, respectively, by means of the belts 38 and 39.

40 is a valve composed of a disk having formed therethrough the slots 41 and 42, the former being considerably longer than the latter and adapted to register with the air-passage 43, and the slot 42 is adapted to register with the oil-hole 44 once in every revolution of the valve-disk 40. Leading to this valve is a pipe 56, which connects, by means of the valve 55 and the pipe 45, with the reservoir 46, secured to the saddle-post tube 47, arranged to carry the supply of gasolene or other liquid hydrocarbon to be supplied to the retorts for generating the gas. The disk-valve is revolved by a pulley 48, secured upon the same short shaft 49 and connected to the shafts 35 by belts 50.

The operation of the portion of the machine above described will be as follows: The lamps 16 are first lighted and permitted to burn a sufficient length of time to heat the diaphragms 15, when the power-shaft is given an initial movement, thereby putting in motion the valves 40, which will admit small quantities of oil through the openings 42 to the retorts, where said oil will be converted into gas, as before described, which latter will be ignited by the sparkers and thus expanded, so as to produce a pressure within the tubes 12 and 13 and extensions 10 and 11. This pressure will force the plunger-valves 20 and 21 inward against the action of the springs 23, causing the passages through said valves to register with the compartment in which the motor-wheel is journaled, thereby admitting the expanded gas to this compartment, and said gas will then act upon the blades 3, causing the motor-wheel to revolve after the manner of a turbine.

In practice the valves 40 are so timed relative to each other that the oil will be admitted first to one retort and then the other in order that a practically-continuous action may be had upon the motor-wheel by the alternate admission of gas to the motor-wheel compartment.

As is well understood, the best results are had in the use of gas generated from a liquid hydrocarbon for propulsion purposes by mixing therewith a certain proportion of atmospheric air, and this I accomplish by the registering of the elongated slot 41 with the air-passage 43, through which the proper amount of air will pass to the retort by means of the passage 70 just prior to the explosion of the gas after its generation by the sparker.

After the gas admitted to the motor-wheel compartment has acted upon the blades and expended its force it is necessary that it shall have egress therefrom, so as to prevent back pressure, and provision is made for this escape of the expended gases by the exhaust 51, which leads from the motor-wheel compartment to the atmosphere.

52 are a number of openings of sufficient size to admit the proper quantity of air to the fan 4, by which it will be driven through the spaces formed around the casing by the air-jacket 53, and the air thus circulated is conveyed from the air-jacket through the nozzle 54, which is so arranged within the exhaust 51 as to cause a suction in said exhaust by induction, which will facilitate the withdrawal of the expended gases from the motor-wheel compartment, as is well understood.

The circulation of the air, as just described, within the air-jacket and around the casing is for the purpose of reducing the temperature of the parts through which the heated gas passes.

To control the flow of oil and air to the valves 40, a compound valve 55 is arranged within the oil and air feed pipes 56 and 57, respectively, having a valve-stem provided with a beveled gear 60, adapted to mesh with the pinion 61, carried by the spindle 62, and geared at 63 to an upright rod 64 extending within easy reach of the rider, where it is provided with a hand wheel or lever 65. By this arrangement the rider may regulate the amount of oil and air fed to the automatic valves without dismounting.

The power of the motor is utilized upon the bicycle by the sprocket-chain 65, passing around the sprocket 7 and also over the crank sprocket-wheel 67, and rearward around the rear sprocket-wheel 68. Thus the machine may be either propelled by the cranks in the usual manner or by the motor independent of the cranks, or by both cranks and motor. An advantage which this arrangement has is that the initial movements may be imparted to the several valves by the starting of the bicycle in the usual manner, thus obviating the necessity of revolving any part of the motor by hand.

While the construction here shown is especially applicable to a bicycle it is obvious that the parts may be arranged so as to adapt the device for use in connection with any style of vehicle.

Having thus fully described my invention, what I claim as new and useful is—

1. In a device of the character described a casing, a motor-wheel journaled therein, right-angular tubular extensions formed on the opposite sides of the casing, a cylindrical valve slidable in an arm of each extension, said valve being hollow with one end closed and an opening near that end adapted to register with the other arm of the extension and means for operating the valves and wheel by expanded gases as and for the purpose described.

2. In a device of the character described a casing, a motor-wheel journaled therein, means for operating the wheel by expanding gases, a fan formed on said wheel adapted to circulate air through the casing and an exhaust-pipe leading from the casing having an internal nozzle through which the air escapes and carries with it by suction the expanded gases as and for the purpose described.

3. In a device of the character described, a casing, a motor-wheel journaled therein, tubular extensions formed on said casing, valves sliding in said extensions, projections on said valves sliding in openings of the casing, springs located in said openings bearing on the projections said extensions having ports leading to the motor-wheel adapted to be opened by the movement of the valve and means for operating the valve by expanding gases, as and for the purpose described.

4. In a device of the character described, a casing, a motor-wheel journaled therein, tubular extensions formed on said casing, valves sliding in said extensions, ports in the extensions leading to the motor-wheel adapted to be operated by the movement of the valves, means for operating the valve by expanding gases, a fan formed on the motor-wheel adapted to circulate air through the casing, and an exhaust-pipe leading from the casing having a nozzle through which air escapes and carries with it the expanding gases, as and for the purpose described.

In testimony whereof I have hereunto affixed my signature in the presence of two subscribing witnesses.

GEORGE W. FOYE.

Witnesses:
S. S. WILLIAMSON,
MARK BUFORD.